United States Patent [19]

Kobayashi et al.

[11] Patent Number: 5,426,294
[45] Date of Patent: Jun. 20, 1995

[54] GLARE SENSOR FOR A VEHICLE

[75] Inventors: Shoji Kobayashi; Toshihisa Hayami; Masaaki Ishikawa, all of Shizuoka, Japan

[73] Assignee: Koito Manufacturing Co., Ltd., Tokyo, Japan

[21] Appl. No.: 67,097

[22] Filed: May 26, 1993

[30] Foreign Application Priority Data

May 27, 1992 [JP] Japan .............................. 4-041905 U
Jun. 5, 1992 [JP] Japan .................................. 4-146027
May 14, 1993 [JP] Japan .................................. 5-136920

[51] Int. Cl.$^6$ ............................................. B60Q 1/14
[52] U.S. Cl. ..................................... 250/226; 250/205
[58] Field of Search ..................... 250/226, 205, 208.1, 250/208.2, 214 D, 214 AL, 216; 356/218, 221, 222, 225

[56] References Cited

U.S. PATENT DOCUMENTS 4,799,768  1/1989  Gahan .
4,891,559  1/1990  Matsumoto et al. .
5,235,178  8/1993  Hegyi ................................... 250/226

FOREIGN PATENT DOCUMENTS 0230620  12/1986  European Pat. Off. .
3217227  11/1982  Germany .
3428364  2/1986  Germany .
3936120  5/1991  Germany .

Primary Examiner—David C. Nelms
Assistant Examiner—John R. Lee
Attorney, Agent, or Firm—Sughrue, Mion, Zinn, Macpeak & Seas

[57] ABSTRACT

A glare sensor includes a light condensing means for condensing light beams from the fore scene and photo sensing element for sensing the light beams from the light condensing means. The photo sensing element is constructed with photodiodes. Blue filters are selectively coupled with the photodiodes. With provision of the blue filters, the glare sensor is able to discriminate red light from white light or yellow light. The output signals of the photodiodes with the blue filters and the photodiodes with no filters are used for detecting the direction and color of the light coming from the fore scene. With this, the glare sensor is capable of detecting forerunning cars, oppositely running cars and traffic lights.

35 Claims, 10 Drawing Sheets

GLARE SENSOR FOR A VEHICLE

BACKGROUND OF THE INVENTION

The present invention relates to a glare sensor for detecting forerunning vehicles, oppositely running vehicles and traffic lights and, more particularly, the invention relates to a glare sensor for detecting colors of light beam emitted from front side of vehicles, traffic lights or the like.

Many proposals have been made of the car-carried devices, which automatically changes the intensity and-/or direction of light beams so as to give no glare to the drivers of forerunning cars and cars running in the opposite direction. When the oppositely running car is present, the device tilts the light beams of the head lamp to the left. When the forerunning car is present, the light beams are further tilted downward.

To switch the light distribution pattern, the forerunning cars and the oppositely running cars must be discriminatively recognized accurately. In the prior technique, the discriminative recognition of those objects depends on the brightness of incoming light from the objects. However, the technique fails to discriminate light from the car from light of others. Further, it is almost impossible to discriminate the forerunning car from the oppositely running car. Therefore, the light distribution characteristic of the head lamp cannot be properly adjusted. This makes it difficult to put the devices into practice.

SUMMARY OF THE INVENTION

For the above background reasons, the present invention has an object to provide a glare sensor which is capable of discriminatively detecting forerunning cars, oppositely running cars and other light emitting objects than cars, such as street lamps, lamps or private houses, and traffic lights (referred to traffic lights and the like).

The glare sensor comprises a light condensing means for condensing light beams from the fore scene and photo sensing elements for sensing the light beams from the light condensing means. The photo sensing element is able to discriminate red light from at least white light or yellow light.

The photo sensing elements are arrayed in a matrix fashion. The output signals of the photodiodes are used for detecting the direction and color of the light coming from the fore scene. Therefore, the glare sensor is capable of detecting forerunning cars, oppositely running cars and traffic lights.

DETAILED DESCRIPTION OF THE PREFERRED EMBODIMENTS

Figure 1A:
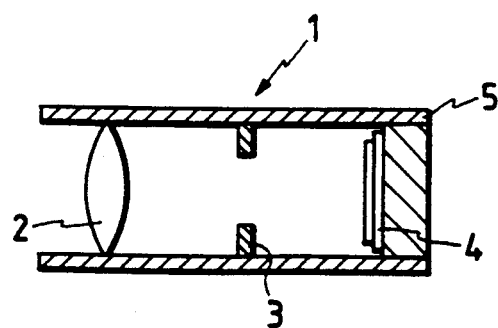
FIG. 1A is a cross sectional view showing an optical system of a glare sensor according to an embodiment of the present invention.
Figure 1B:
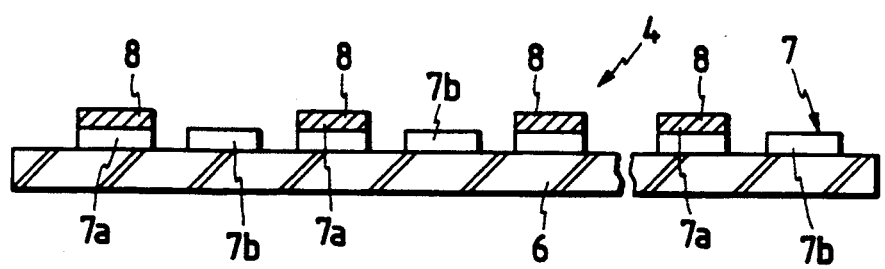
FIG. 1B is an enlarged, cross sectional view showing a photosensor array of the glare sensor.

The preferred embodiments of the present invention will be described with reference to the accompanying drawings. As shown in FIG. 1A showing in cross section the structure of a glare sensor according to an embodiment of the present invention, a glare sensor 1, contained in a tubular casing 5, is comprised of an image forming lens 2 for condensing light received from the scene seen ahead of a car and focussing the received light on an image plane, a flare stop 3, and a photosensor array 4 disposed on the image plane of the image forming lens 2. The photosensor array 4, as shown in FIG. 1B, consists of a number of minute photodiodes 7 matrix-arrayed at a high density on a planar substrate 6. The photodiodes 7, of which the spectral sensitivities for white light are substantially uniform, produce electrical signals according to the brightness of image light formed by the image forming lens 2. Filters 8 of blue color, for example, cyan, are layered on the front faces of the selected photodiodes 7a alternately arrayed. The filters 8 shut off red light, which is the complementary color of the blue color. Therefore, the selected photodiodes 7a are insensitive to red light or produces little electrical signals when receiving red light.

Figure 2:
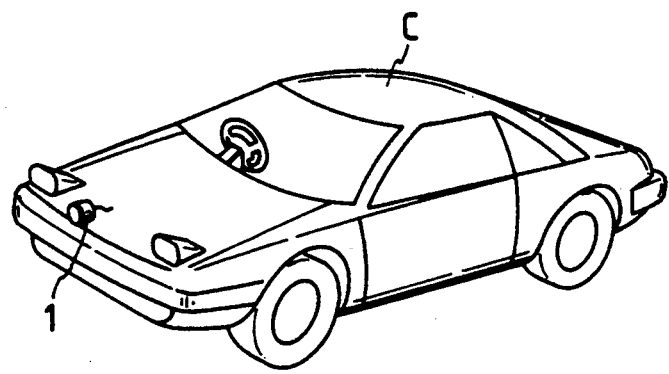
FIG. 2 is a view schematically showing a car carrying a glare sensor of the invention mounted at a specific location.

The glare sensor 1 thus constructed is mounted at or near to a location of the front bumper of a car C as shown in FIG. 2. Light coming from the scene in front of the car is limited in its passing area by the flare stop, and imaged on the photosensor array 4 by the image forming lens 2. Upon receipt of the image light, the individual photodiodes 7 of the photosensor array 4 produce electrical signals. In this case, white light contained in the received light directly hits the photodiodes 7a and 7b to cause them to generate electrical signals, but the red light substantially fails to reach the photodiodes 7a to cause them to generate little electrical signals.

Through measurement of distributions of amplitudes of electrical signals from the specific photodiodes 7a with the blue filters and those from the photodiodes 7b with no filters, it is possible to discriminately know the types of the light coming from the fore scene, light from the head lamp of the car running in the opposite direction, light from the tail lamp from the forerunning car, or light from the traffic light.

Figure 3:
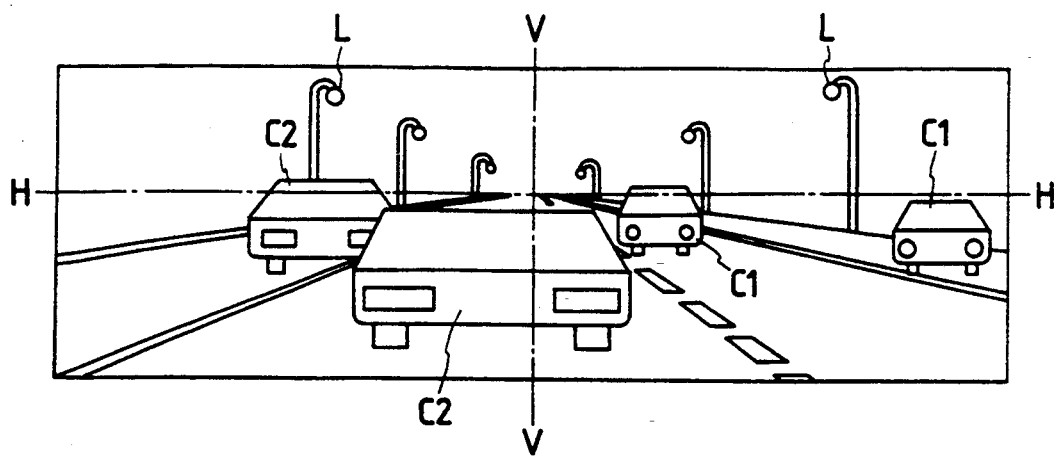
FIG. 3 is a view showing a model of the scene present ahead of a car.

A scene present in front of a car is illustrated as a model in FIG. 3. As shown, oppositely running cars C1 and forerunning cars C2 are present below the horizon H, and traffic lights L (including street lamps) above the horizon H. Below the horizon H two forerunning cars C2 are present at near the vertical center line V and on the left side thereof, and two cars C1 run on the right side of the vertical center line V. Light coming from the fore scene containing the cars and traffic lights is received by the photodiodes 7, which are set at the location corresponding to the horizon H—the vertical center line V. Amplitudes of the electrical signals generated by the photodiodes 7 are measured. Accordingly, the electrical signals generated by the photodiodes 7 when receiving the light coming from the scene above the horizon H contain those signals representative of white light and yellow light. When the amplitudes of the electrical signals produced by the photodiodes 7b with no filters are larger than those of the electrical signals by the specific photodiodes 7a with the blue filters 8, the signals representative of red light are present.

The electrical signals produced by the photodiodes 7, which receive the light coming from the region in the fore scene located below the horizon H and on the right side of the vertical center line V, contain color information of white and yellow. The light of those colors is emitted by the head lamps of the oppositely running cars. Therefore, it is understood that the cars running toward this side are present in that region of the fore scene. The electrical signals produced by the photodiodes 7, which receive the light coming from another region in the fore scene located below the horizon H and on the left side of the vertical center line V, contain information of color light emitted from private housings located on the left side of the road. When the amplitudes of the electrical signals output from the photodiodes 7b with no filters, which receive the light coming from this scenic region, are larger than those of the electrical signals from the specific photodiodes 7a with the blue filters 8, it is understood that the tail lamps of the forerunning cars are present.

The cars running this side and the forerunning car can be known by detecting the light coming from the fore scene of a car in this way. Accordingly, if the head lamp is switched from the high beam to the low beam according to the light detection results, it is possible to eliminate the dazzling problem of the driver of the oppositely running car. Further, if the light beam of the head lamp is tilted to the left and downward, the nuisance to the driver of the forerunning car can be minimized.

Figure 4:
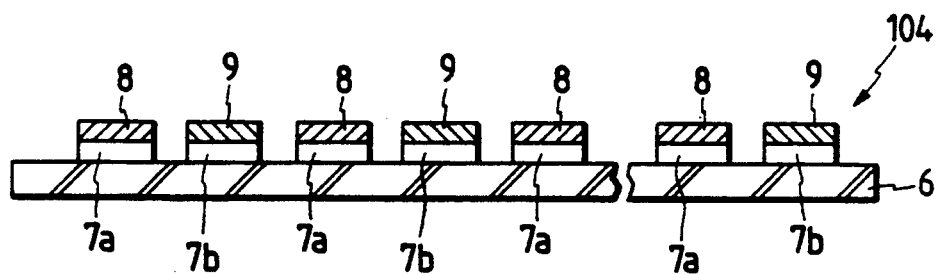
FIG. 4 is a cross sectional view showing a modification of the photosensor array used in the first embodiment of the invention.

The photosensor array in the glare sensor may be modified into the construction as shown in FIG. 4. As shown, in a photosensor array 104 of the modification, photodiodes 7a with blue filters 8 and photodiodes 7b with red filters 9 are alternately arrayed. When the photosensor array 104 receives the light from tail lamp of the forerunning car, the ratio of the electrical signals output from the photodiodes 7a with the blue filters 8 to those from the photodiodes 7b with red filters 9 is great. Comparison of those output signals will ensure a further reliable detection of the forerunning cars and the cars running this side.

Figure 5:
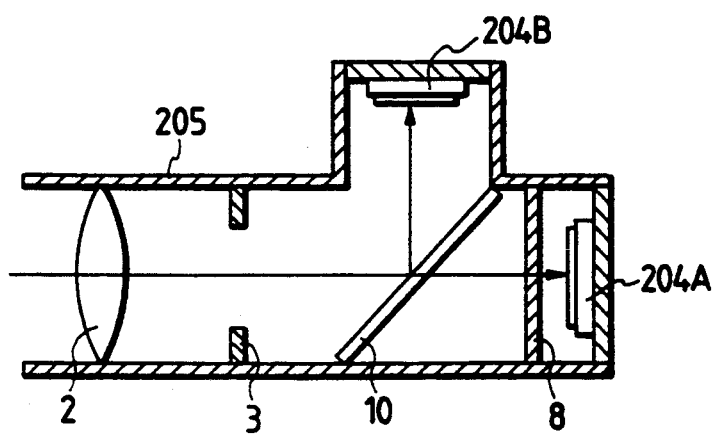
FIG. 5 is a cross sectional view showing an optical system of a glare sensor according to another embodiment of the present invention.

FIG. 5 is a cross sectional view showing an optical system of a glare sensor according to another embodiment of the present invention. In the figure, reference numeral 2 designates an image forming lens 3 represents a flare stop. A beam splitter 10 consisting of a half-mirror, for example, is located in the poststage of the flare stop 3. The incoming light beam is split into two beams, which travel in two directions to reach photosensor arrays 104A and 104B. The photosensor arrays 104A and 104B each consist of a number of minute photodiodes arrayed at a high density in a matrix fashion. A filter 8 of blue color is located in the prestage of the photosensor array 204A. No filter is provided in the prestage of the photosensor array 204B. Reference numeral 205 is representative of a casing.

The glare sensor thus constructed, like that of the first embodiment, is capable of detecting forerunning cars, the oppositely running cars, traffic lights, and the like by using the output signals of the photosensor array 204A associated with the blue filter 8 and the photosensor array 204B associated with no filter.

It is noted that in the construction of the glare sensor, the signals output from all of the photodiodes of the photosensor arrays can be used. Accordingly, the signal level of the output signals of those photosensor arrays is high. The detection of the state of the fore scene is more exact and reliable.

The beam splitter 10 may have a wavelength select function. For example, if the beam splitter 10 is designed so as to allow light of blue color to pass therethrough, the blue filter 8 is omissible.

Figure 6A:
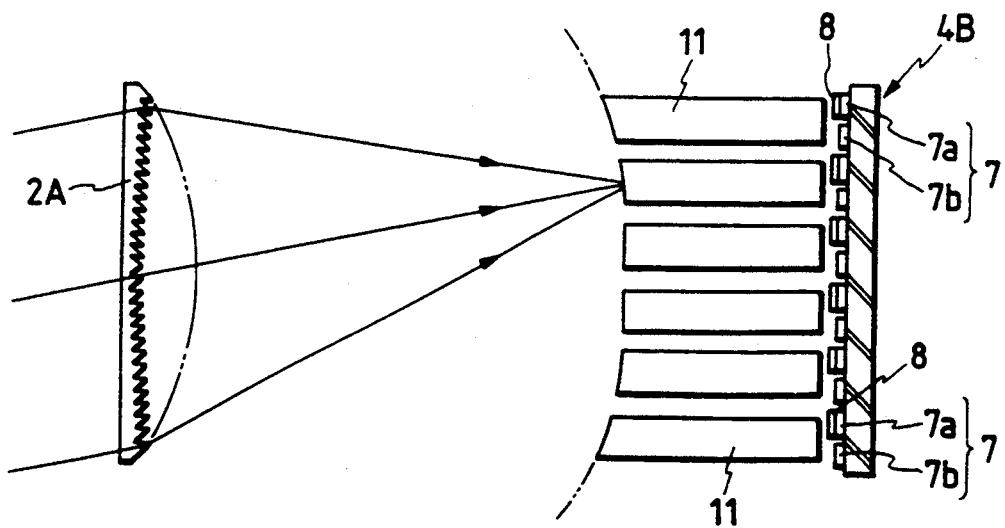
FIG. 6A is a plan view showing an optical system of a glare sensor according to yet another embodiment of the present invention.
Figure 6B:
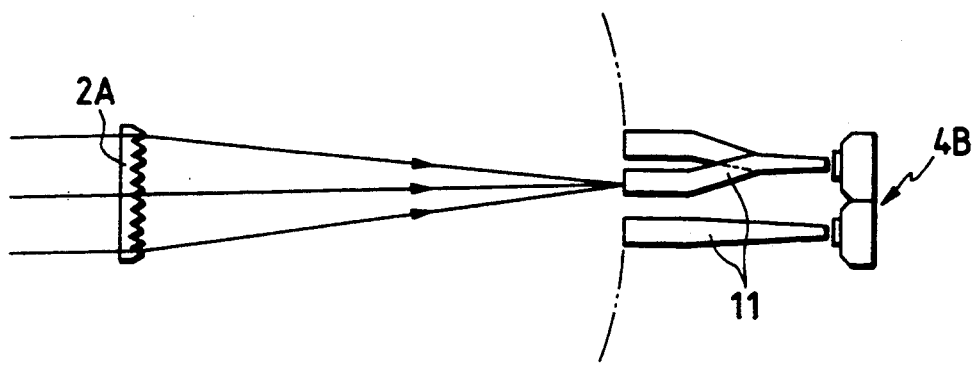
FIG. 6B is a side view showing the optical system of the glare sensor of FIG. 6A.

FIGS. 6A and 6B are plan and side views showing an optical system of a glare sensor according to yet another embodiment of the present invention. In this embodiment, a Fresnel lens 2A is used as an image forming lens. The end faces of a number of optical fibers 11 are matrix arrayed on the image forming plane of the Fresnel lens. The other end faces of the optical fibers 11 are disposed facing a photosensor array 4B, viz., paired photodiodes 7a and 7b. Each photodiode pair consists of a photodiode 7a with a blue filter 8 provided on the front side, and another photodiode 7b with no filter.

In the glare sensor thus constructed, an image pattern formed by the Fresnel lens 2A is rearranged by the optical fiber 11, and the rearranged pattern is detected by the photosensor array 4B. Accordingly, the first end faces of the optical fibers 11 are arrayed in a matrix fashion, but the second end faces may be arranged properly. Therefore, the photodiodes 7 may be properly arranged in the photosensor array 4B.

The glare sensor of this embodiment is likewise capable of detecting the objects, such as forerunning cars, oppositely running cars, and traffic lights, in the fore scene of a car.

Figure 7:
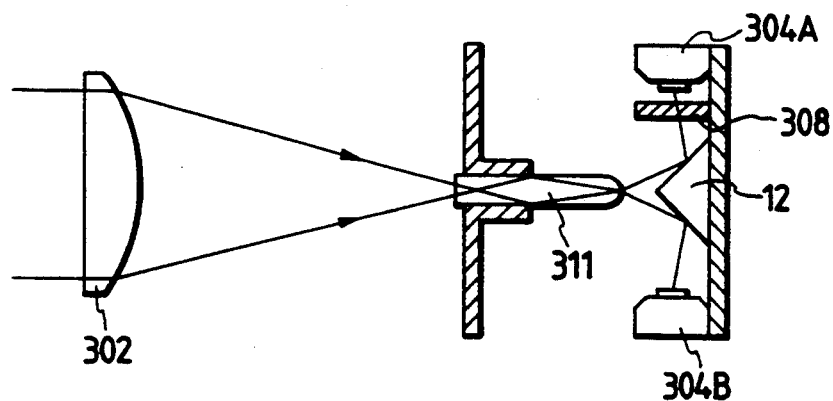
FIG. 7 is a cross sectional view showing a modification of the optical system of the flare sensor of FIG. 6.

The glare sensor of FIG. 6 may be modified to have the construction as shown in FIG. 7. As shown, in this flare sensor, a normal planoconvex lens is used for the image forming lens. A beam splitter 12 as a triangle prism is located facing the second end face of an optical fiber 311. The light beams emanating from the beam splitter 12 are focused on photosensor arrays 304A and 304B, respectively. In this case, a blue filter 308 is preferably disposed on the fore side of the photosensor array 304B. In the illustration, no filter is disposed on the fore side of the photosensor array 304A. If required, a red filter may be located there.

Figure 8A:
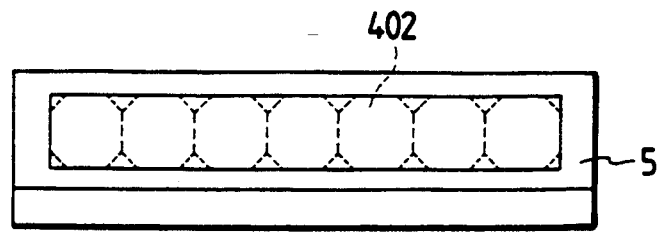
FIG. 8A is a front view showing an optical system of a glare sensor according to still another embodiment of the present invention.
Figure 8B:
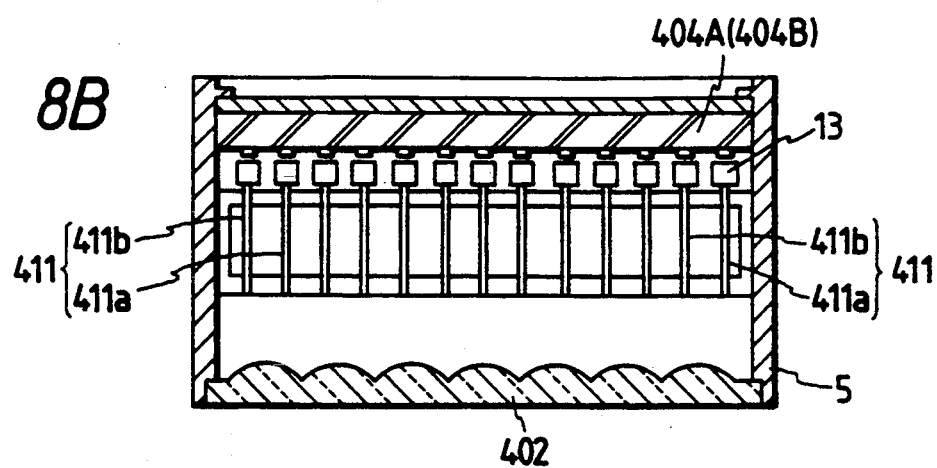
FIG. 8B is a plan view showing the optical system of the glare sensor of FIG. 8A.
Figure 8C:
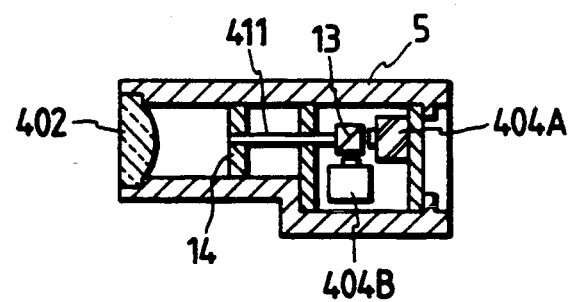
FIG. 8C is a cross sectional view showing the optical system of the glare sensor of FIG. 8A when viewed from the side.
Figure 9A:
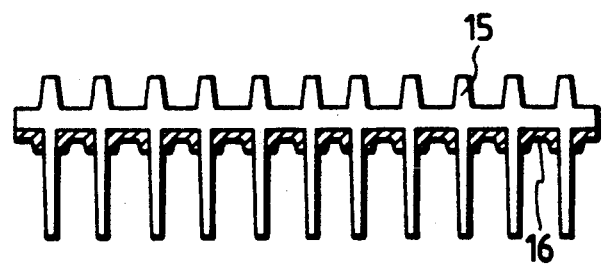
FIG. 9A is a plan view showing a light guide lens is used instead of the optical fiber pairs, which forms a modification of the embodiment of FIG. 8.
Figure 9B:
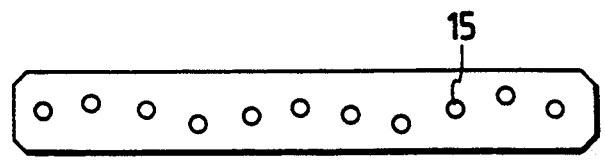
FIG. 9B is a front view showing the light guide lens of FIG. 9A.

FIGS. 8A to 8C show front, plan and cross sectional views showing an optical system of a glare sensor according to still another embodiment of the present invention. In this embodiment, a plural number of image forming lenses 402 are arrayed side by side as shown. Optical fiber pairs 411 each consisting of optical fibers 411a and 411b are disposed in a state that the first end faces of each pair of optical fibers are opposed to the corresponding image forming lens 402, and the second end faces thereof are coupled with beam splitters 13, respectively. Photosensor arrays 404A and 404B, disposed at a right angle, face the different sides of the beam splitter 13, as shown. With the construction, light beams coming from the fore scene of a car in the different directions are respectively guided through the different optical fibers 411a and 411b to the different photosensor arrays 404A and 404B. The photodiodes of the photosensor arrays 404A and 404B are selectively coupled with blue filters and red filters (not shown). Reference numeral 14 designates an optical fiber support.

With the above-mentioned construction of the glare sensor, it is possible to discriminate the white or yellow light from the red light, to detect the direction of the incoming light, and the oppositely running cars, forerunning cars, and traffic lights on the basis of the output signals of the photodiodes with the blue and red filters.

In the glare sensor of FIG. 8, the optical fiber pair may be substituted by a light guide lens 15 formed of transparent resin. Lens pieces constituting the light guide front side, as shown. The photodiodes, which are respectively disposed in opposition to the lens pieces, can receive light beams coming through the fore scene in different directions. Reference numeral 16 indicates a light-shield film.

Figure 10A:
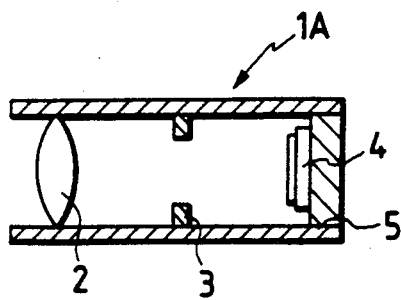
FIG. 10A is a cross sectional view showing a glare sensor incorporating the present invention.
Figure 10B:
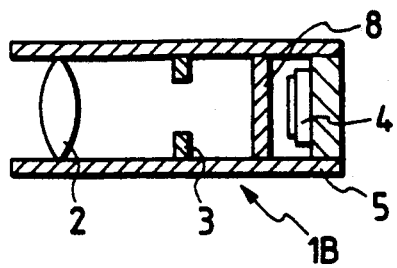
FIG. 10B is a cross sectional view showing another glare sensor incorporating the present invention.
Figure 11:
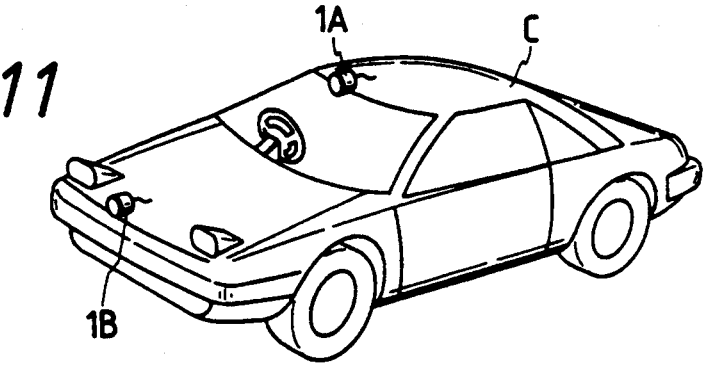
FIG. 11 is a view schematically showing a car carrying the glare sensors shown in FIG. 10 mounted at two specific locations.

FIG. 11 is a view schematically showing a car carrying the glare sensors shown in FIG. 10 mounted at two specific locations; Two types of glare sensors are illustrated in FIG. 10. The first glare sensor 1A shown in FIG. 10A is made up of an image forming lens 2, a flare stop 3, and a photosensor array 4. The second glare sensor 1B shown in FIG. 10B is made up of an image forming lens 2, a flare stop 3, a blue filter 8, and a photosensor array 4. The photosensor arrays of those glare sensors may be those shown in FIG. 1B or 4. The glare sensor 1B having the blue filter and the glare sensor 1A having no filter may be respectively mounted at a location of the front bumper of a car C and at a location near the window shield, as shown in FIG. 11.

The image forming lenses 2 of the glare sensor 1A and 1B are directed in the running direction. The glare sensor 1B having the blue filter receives the upward light beam, while the glare sensor 1A having no filter receives both the upward and downward light beams. Accordingly, the light beams coming from the fore scene of a car can be more properly detected.

Figure 12:
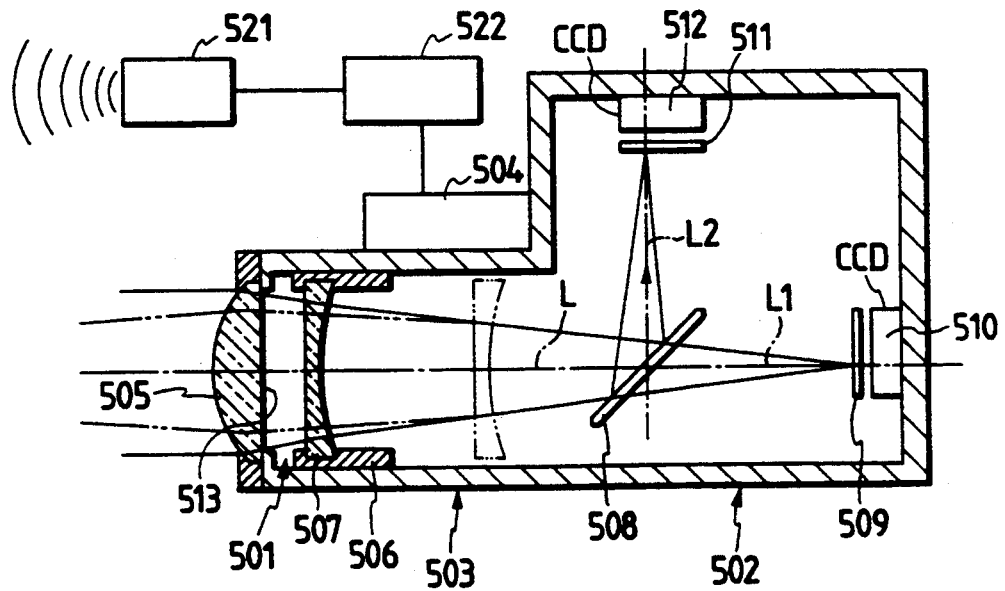
FIG. 12 is a longitudinal sectional view showing an optical system of a glare sensor in use with a car according to an additional embodiment of the present invention.
Figure 13:
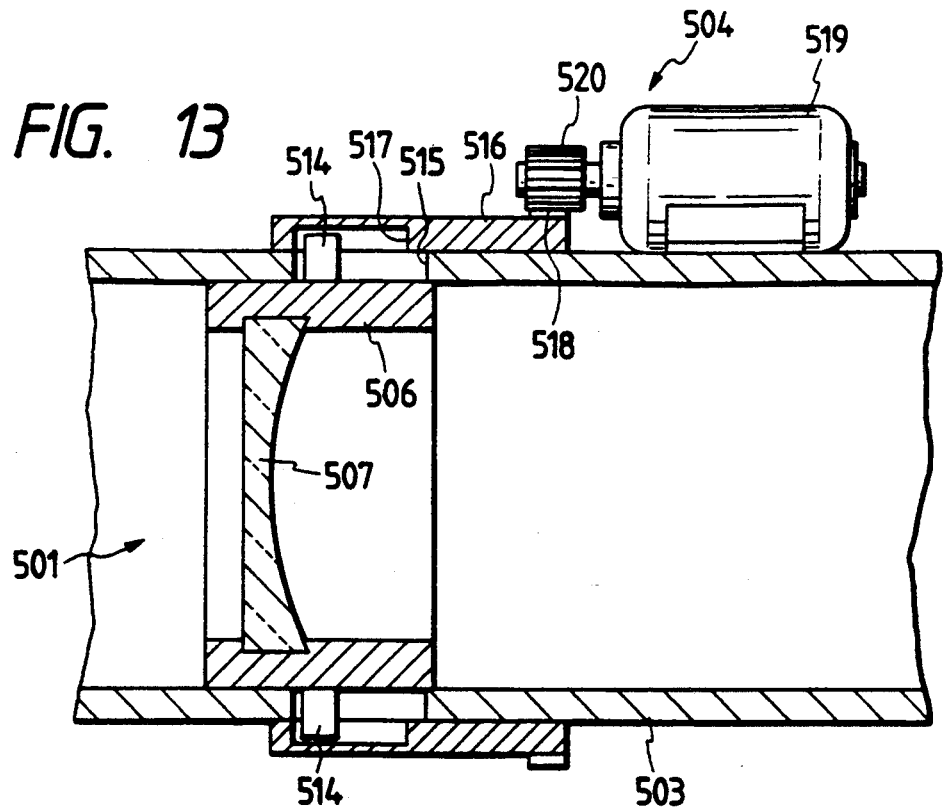
FIG. 13 is an enlarged cross sectional view showing a lens drive section of the glare sensor of FIG. 12.
Figure 14:
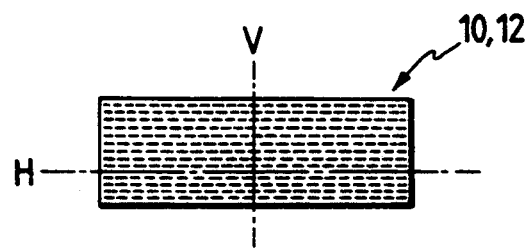
FIG. 14 is a front view showing the CCD image pickup element used in the glare sensor.

In FIGS. 12 through 14 showing a glare sensor according to an additional embodiment of the present invention, FIG. 12 is a longitudinal sectional view showing an optical system of a glare sensor in use with a car according to an additional embodiment of the present invention. FIG. 13 is an enlarged cross sectional view showing a lens drive section of the glare sensor of FIG. 12.

A zoom objective 501, fit into a tubular portion 503 of a casing 502, includes a first lens system fixed at the fore end of the tubular portion 503 and a second lens system, which is moved with respect to the first lens system by a lens driver 504. The first lens system consists of a fixed lens 505 as a planoconvex lens. The second lens system includes a movable lens 507 as a planoconcave lens, which is fastened to a slide tube 506. The slide tube 506 is slidable parallel to the optical axis L of the fixed lens 505 with respect to the tubular portion 503.

The slide tube 506 is movable along the optical axis L by a lens driver 504 to be given later. It moves the movable lens 507 along the optical axis L with respect to the fixed lens 505, thereby changing the focal position of the zoom objective 501. The first lens system and the second lens system of the zoom objective 501 may properly be combined. In this embodiment, the planoconvex lens is used for the fixed lens 505 of the first lens system and the planoconcave lens, for the movable lens 507 in the second lens system, in order to remove the color aberration.

A beam splitter 508, constructed with a half-mirror of the multilayer film structure, is provided on the rear side of the fixed lens 505 and on the optical axis L. The beam splitter 508 is slanted at an angle of 45° to the optical axis L. A CCD image pickup element 510 lies on the optical axis L1 on the rear side of the beam splitter 508. A red filter 509 is located in front of the CCD image pickup element 510. Another CCD image pickup element 512 lies on another optical axis L2 on the rear side of the beam splitter 508. A blue filter 511 is located in front of the CCD image pickup element 512. The image pickup surface of each of the CCD image pickup elements 510 and 512 has preferably such a rectangular shape that it is asymmetrical with respect to the horizontal axis H, viz., the upper part thereof is larger than the lower part, as shown in FIG. 14.

The inner surface of the fixed lens 505 is coated with an infrared-rays cut film 513 as a thin film of the type which allows light to selectively transmit therethrough.

The structure of the lens driver 504 follows. A coupling pin 514 is protruded from a slide tube 506. An elongated hole 515 elongating in the optical axis L is formed in the tubular portion 503 of the casing. A helical tube 516 with a helical groove 517 is rotatably coupled with the tubular portion 503. The coupling pin 514 is upstanding passing through the elongated hole 515 and slidably coupled with the helical groove 517. A gear 518 is provided on the outer surface of the end of the helical tube 516. A drive gear 520 is fastened to the drive shaft of a reversible motor 519, which is tightly mounted on the casing 502 by means of screws. The gear 518 is in mesh with the drive gear 520. When the control motor 519 turns, the coupling pin 514 coupled with the helical groove 517 is moved in the direction of the tube axis, through the gear mechanism. As a consequence, the movable lens 507 is moved forward and backward along the optical axis L.

Figure 15:
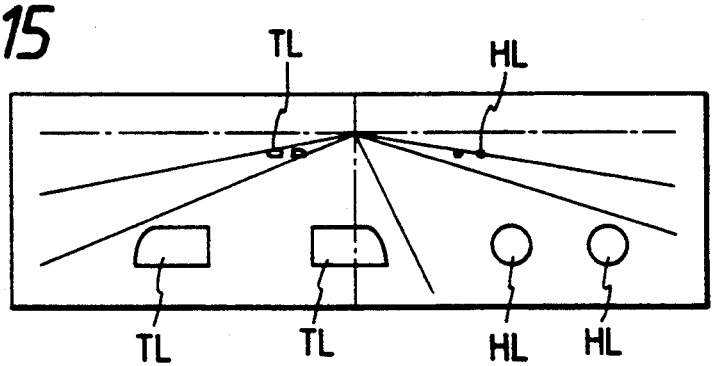
FIG. 15 is a diagram showing an image formed on the surface of the CCD image pickup element.

In the operation of the glare sensor thus constructed, the lens driver 504 moves the movable lens 507 of the zoom objective 501 in accordance with a distance of a measuring car and a measured car. With the movement of the movable lens 507, the focal position of the lens is adjusted so as to form images on the CCD image pickup elements 510 and 512 (FIG. 15). The car-to-car distance is measured by a infrared-rays distance measuring instrument 521. A controller 522 controls the control motor 519 so as to turn by an angle, which depends on the measured value. As a result, the movable lens 507 is moved to a preset position by the helical mechanism.

The controller also carries out the following control process. When the CCD image pickup element 510, which lies on the transmission optical axis L1, picks up a lamp image TL, the light beam from the head lamp of the measuring car is tilted downward. When the CCD image pickup element 512, which lies on the reflection optical axis L2, picks up a lamp image HL, the controller recognizes it as "head lamp of the oppositely running car", and tilts the light beam form the head lamp of the measuring car to the left (under the keep-to-the-right rule).

The infrared-rays distance measuring instrument 521 operates as follows. A transmitter/receiver section of the instrument 521 emits forward a near-infrared, pulsative laser beam, and receives laser beam reflected from the reflector of the rear side of a forerunning car or the front side of an oppositely running car. The distance measuring instrument 521 halves the time between the transmission and reception of the laser beam, and outputs it as the distance of the measuring car and the measured car.

When a car to be measured is present at a great distance, the movable lens 507 is controlled so as to approach to the fixed lens 505 (as indicated by a solid line in FIG. 12), and forms the lamp image of the forerunning car or the oppositely running car on the CCD image pickup elements 510 and 512. Such a control of the movable lens 507 makes the images on the CCD image pickup elements clear. Further, the image of the measured car, when it is at a long distance, is enlarged. In this respect, the object discrimination performance is improved.

The infrared-rays distance measuring instrument 521 is used for the car-to-car distance measurement. In this instance of the embodiment, the forerunning car and the oppositely running car are present as the measured cars. The distance D can also be gained using the image on the CCD image pickup element 510 lying on the transmission optical axis L1 (FIG. 16).

Assuming that the focal distance of the fixed lens 505 is f1, the focal distance of the movable lens 507 is f2, and the distance between both lenses is d, the focal distance f' of the movable lens 507 when both the lenses are combined is $$1/f' = 1/(f1-d) + 1/f2$$

The theoretical distance f is $$1/f = 1/f1 + 1/f2 - d/f1 \times f2$$

Figure 16A:
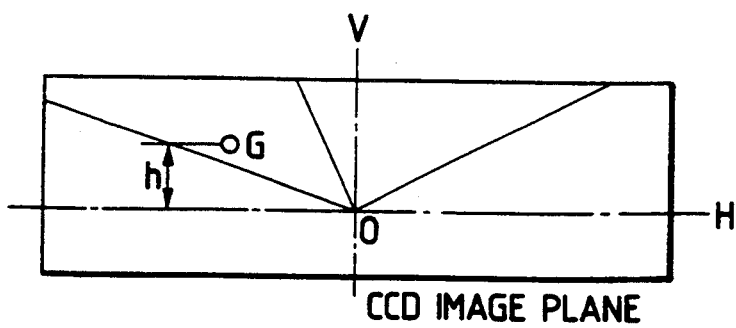
FIGS. 16A and 16B cooperate to show how to measure a car-to-car distance.
Figure 16B:
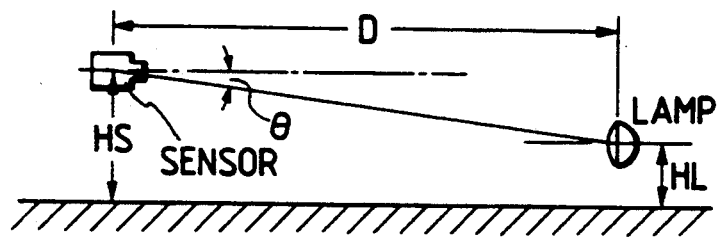

In a case where, as shown in FIG. 16A, a lamp image G is present at a location h higher than the horizon H passing through the optical axis O of the surface of the CCD image pickup element 510, the following equations hold $$f \times \tan\theta = h$$

$$\tan\theta = (HS - HL)/D$$

where HS: height of the sensor mounted

HL: height of the lamp mounted

Rearranging the above equations for the distance D between the measuring and measured cars, we can gain the distance D. Under control of the controller 522, the lens driver 504 is driven to set the movable lens 507 at a desired position.

In the measurement of the distance D by using the CCD image pickup element 510, a plural number of light emitting objects (lamps) frequently appear on the surface of the CCD image pickup element 510. In this case, the image having the highest brightness is selected and image processed, and then the distance calculating process is carried out.

Figure 17:
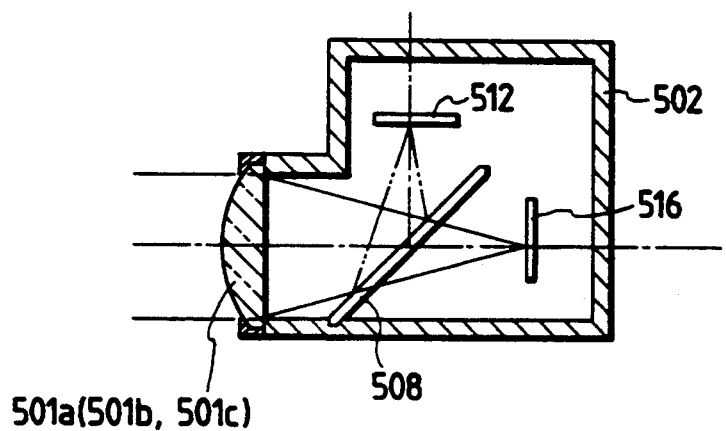
FIG. 17 is a longitudinal sectional view showing a glare sensor according to a further embodiment of the present invention.
Figure 18:
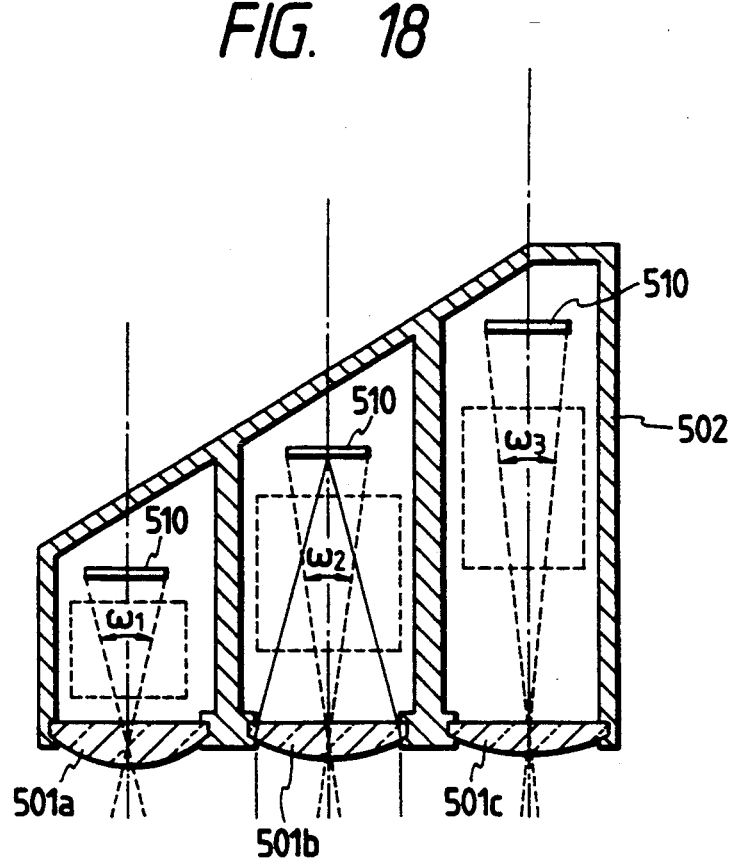
FIG. 18 is a cross sectional view showing the glare sensor of FIG. 17.

A glare sensor according to a further embodiment of the present invention will be described with reference to FIGS. 17 and 18.

The glare sensor of this embodiment consists of three sensor sections, a long-distance sensor section, a medium-distance sensor section, and a short-distance sensor section. The long distance sensor section contains a fixed lens 501a (planoconvex lens) for the long distance measurement, a beam splitter 508 and two CCD image pickup elements 510 and 512. The fixed lens 501a serves as an objective, which corresponds to the zoom objective in the previous embodiment. The beam splitter 508 and the CCD image pickup elements 510 and 512 are located on the rear side of the objective as in the previous embodiment. The medium-distance sensor section and the short-distance sensor section contain fixed lenses 501b and 501c (planoconvex lenses) as objectives, and are constructed as the long-distance sensor section.

In the glare sensor using the fixed lenses 501a, 501b and 501c as objectives, image angles $\omega 1$, $\omega 2$, and $\omega 3$ are different depending on the distance between the measuring car and the measured car (the image angle for the long distance is larger than those for the medium and short distance). The resultant images are substantially equal in size.

The long-, medium- and short distance sensor sections are selectively operated depending on the car-to-car distance, so that the images formed on the surface of the CCD image pickup elements 510 and 512 are always clear. Further, the image of the measured car at a long distance is not reduced in size when it is formed on the CCD element surface. Accordingly, the object discrimination performance is improved.

Figure 19:
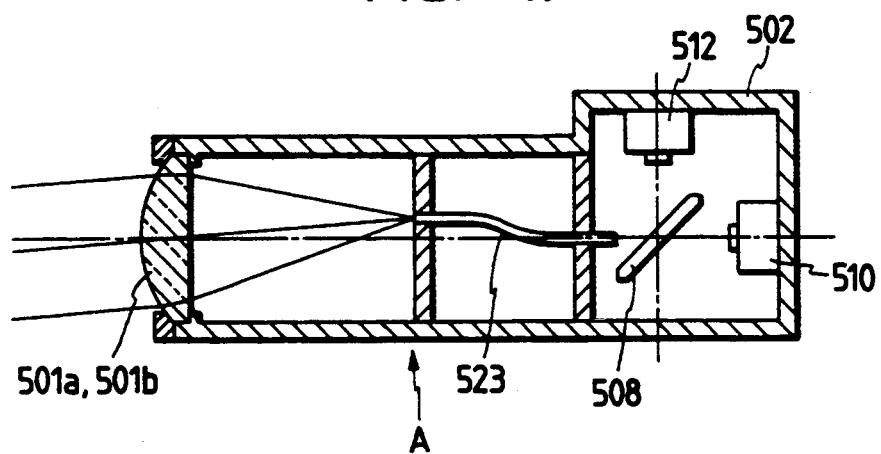
FIG. 19 is a longitudinal sectional view showing a glare sensor according to another embodiment of the present invention.
Figure 20:
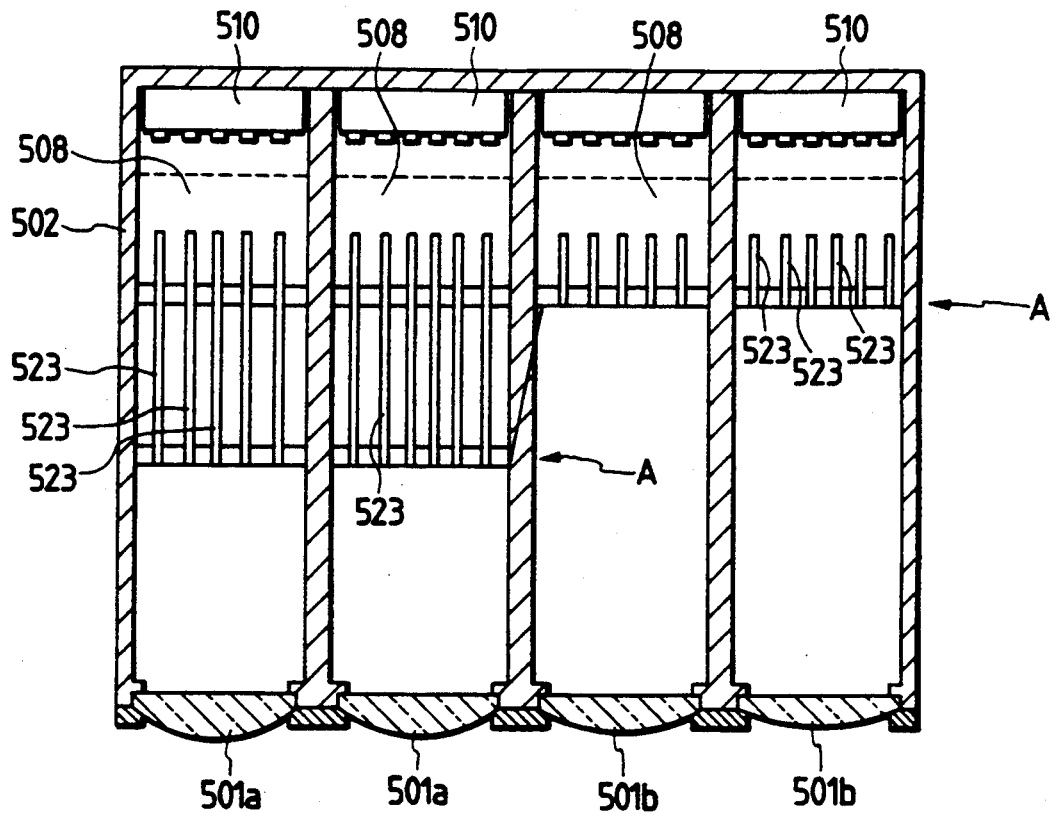
FIG. 20 is a cross sectional view showing the glare sensor of FIG. 19.

A glare sensor according to another embodiment of the present invention will be described with reference to FIGS. 19 and 20.

In this embodiment, a number of optical fibers 523 (may be substituted by the light guide lens) optically couple the focal plane positions (indicated by arrows A) of the fixed lenses 501a and 501b with the beam splitter 508. The glare sensor consists of a pair of long-distance sensor sections and a pair of short-distance sensor sections.

In this embodiment, the optical fibers 523 provide light paths between the focal plane positions of the fixed lenses 501a and 501b and the beam splitter 508. Accordingly, if the focal plane position A of the long-distance sensor section pair is different from that of the short-distance sensor section pair, the quantity of light incident on the CCD image pickup elements 510 and 512 through the beam splitter 508 can be kept substantially constant.

Figure 21:
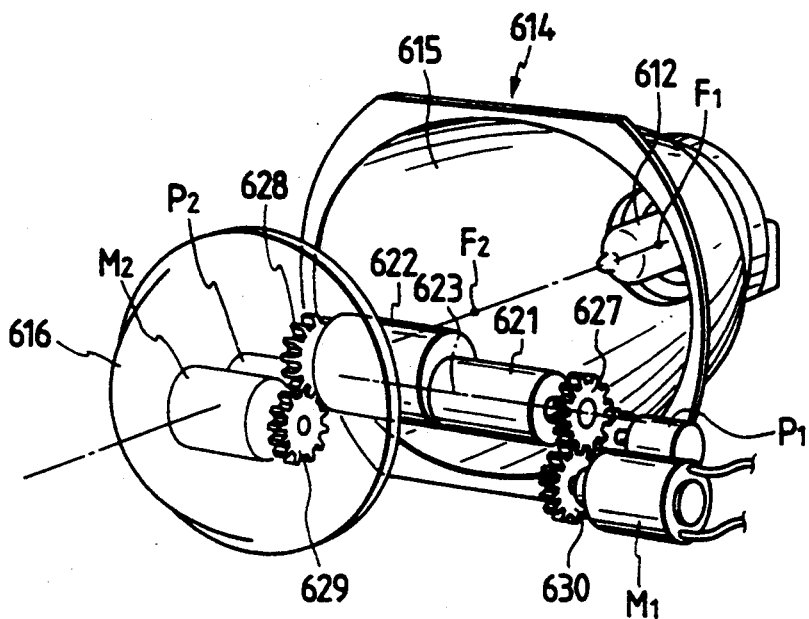
FIG. 21 is a perspective view showing the internal structure of a head lamp according to still another embodiment of the present invention.
Figure 22:
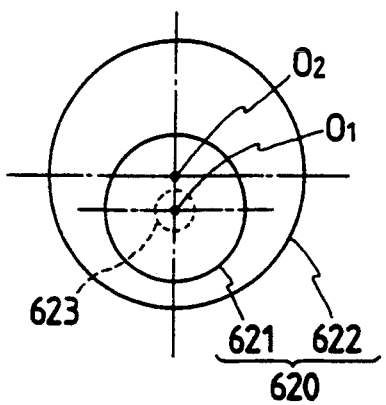
FIG. 22 is a view showing the shape of a shade.
Figure 23:
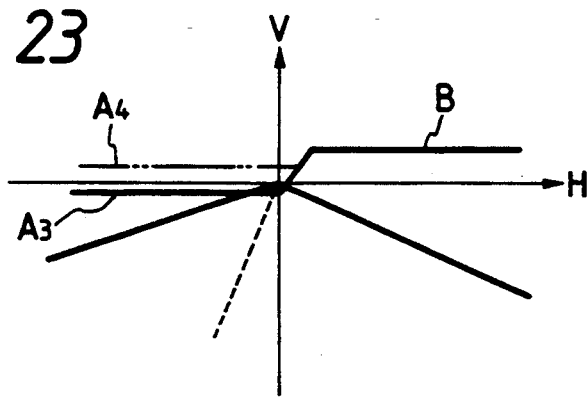
FIG. 23 is a view showing a light distribution pattern of the head lamp of FIG. 21.
Figure 24:
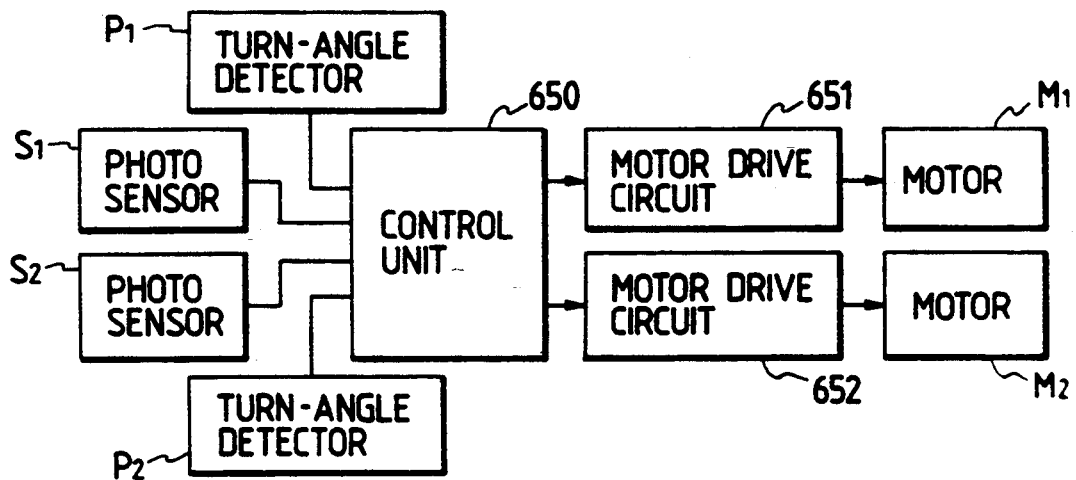
FIG. 24 is a block diagram showing a motor driver.

FIG. 21 is a perspective view showing the internal structure of a head lamp according to still another embodiment of the present invention. FIG. 22 is a view showing the shape of a shade. FIG. 23 is a view showing a light distribution pattern of the head lamp of FIG. 21. FIG. 24 is a block diagram showing a motor driver.

In those figures, a light projection unit 610, supported by an aiming mechanism (not shown), is contained in a capsule-like lamp body (not shown). Although not illustrated, the light projection unit 610 is tiltable vertically and horizontally by the aiming mechanism. Accordingly, the direction of the light beam emitted from the light projection unit 610, viz., the light projection axis (optical axis) of the head lamp, can be tilted vertically and horizontally by operating the aiming mechanism.

In the light projection unit 610, a reflector 614 and a projection lens 616 form a single unit. The reflector 614, which is substantially elliptical, receives a discharge bulb 612. The projection lens 616 is located in front of the reflector 614. The projection lens 616 is supported by a lens holder, not shown, fastened to the reflector 614 by means of screws. Aluminum is vapor deposited on the inner side of the reflector 614, thereby forming an elliptical reflecting surface 615. The elliptical reflecting surface 615 is of the known type having a first focal distance F1 and a second focal distance F2. A discharge portion of the discharge bulb 612 is located at the first focal distance F1 position. Shades 621 and 622 are provided at the focal position of the projection lens 616 and near to the second focal distance F2. These shades form clear cut lines of sub-beams by cutting part of the light beams, which are reflected by the reflector 614 and directed toward the projection lens 616. Light beams emitted from the discharge bulb 612 are reflected by the elliptical reflecting surface lens 615 and guided forward, and are collimated by the projection lens 616. Then, the substantially parallel light beams are projected forward from the projection lens 616 of the head lamp.

The shade 621 is provided with a gear 627, and the shade 622, with a gear 628. The gears 627 and 628 are respectively in mesh with drive gears 629 and 630 fastened to the output shafts of motors M1 and M2. By the drive by the motors M1 and M2, the shades 621 and 622 turn independently.

In this embodiment, only the right shade 622 is eccentric with respect to a horizontal support shaft 623. If the left shader 621 is turned, the clear cut line corresponding to the left shader 621 is immovable. When the right shade 622 is turned, the clear cut line corresponding to the right shade, viz., the clear cut line on the left side of the vertical line V on the light distribution screen, moves vertically within the range between lines A3 and A4.

The quantity of light received by the photo sensor is proportional to a distance between the photo sensor and the oppositely running car or the forerunning car. If the output signal of the photo sensor exceeds a preset value, the main beam emitted from the measuring car may provide a glare directly to the driver of the oppositely running car or through the back mirror to the driver of the forerunning car. A control unit 650 checks whether or not the sensor output exceeds the preset value, or it continues for a time duration in excess of a preset time, e.g., 1 second or more. If the sensor output larger than the preset value continues over the preset time, the control unit recognizes that the car drivers may suffer from glare light. Upon the recognition, the control unit outputs an instruction signal to motor drive circuits 651 and 652 so that the main beams are switched to the sub-beams by turning the shades 621 and 622. To be more specific, when the oppositely running car reaches a location where it is excessively close to the measuring car, the photo sensor S1 responds to the main beam from the oppositely running car, the control unit 650 outputs a signal to the drive circuits 651 and 652, which in turn turns the shades 621 and 622. As a result, the light distribution pattern is switched from the main beam pattern where the clear cut line is defined by lines A4 and B in FIG. 23 to the sub-beam pattern where the clear cut line is defined by lines A3 and B. When the forerunning car reaches a location where it is excessively close to the measuring car, the sensor responds to the light from the tail lamp of the forerunning car, and the main beam pattern is switched to the sub-beam pattern as in the previous manner. P1 and P2 are turn-angle detectors, such as rotary encoders and position meters. The detectors, of which the gears are in mesh with the gears 627 and 628, detect turn angles of the shades 621 and 622, which are fed back to the control unit 650.

In the embodiments as mentioned above, filters of green color may be located in front of the photo diodes, e.g., immediately after the image forming lens. With provision of the green filters, the spectral sensitivity of the photodiodes of the sensor array and the photo sensor is equal to that of the eyes of a human being.

The photodiodes of the photo sensors may be substituted by CCD elements.

As described above, the photo sensing element for sensing light coming from the fore scene is capable of discriminating red light from white light or yellow light when it senses incoming light. Accordingly, the direction and color of the incoming light can be recognized from the output signals of the photo sensing element. Accordingly, the glare sensor of the invention can accurately detect the forerunning cars, oppositely running cars, and traffic lights. Thus, the glare sensor is capable of properly and automatically adjusting the light distribution characteristics of the head lamp of the measuring car, thereby providing no glare to the drivers of the forerunning cars and the oppositely running cars.

Further, in the glare sensor of the invention, the zoom lens or the plural number of lenses are used for the objective for condensing the light beams from the lamps of the cars running in the fore scene, when the incoming light color is detected by the CCD image pickup elements. Accordingly, the enlarged image of the car running at a long distance can be formed on the CCD element surface. This improves the S/N ratio. Further, the color of the incoming light from the objects can be recognized irrespective of the distance of the objects, ensuring good object discriminating performances.

What is claimed is:

1. A glare sensor for use in a vehicle, comprising:
holder means attached on a vehicle;
lens means disposed on said holder means for condensing an incident light;
means mounted in said holder means for detecting at least one of color and intensity of said incident light condensed by said lens means, said detection means generating a detection signal in response to said detection, wherein said detection means comprises a first detecting elements group and a second detecting elements group, and further comprises blue filters for each of said first detecting elements.

2. The glare sensor of claim 1, wherein an image forming plane is divided into four planes by a horizontal line and a center vertical line of the vehicle.

3. The glare sensor of claim 1, wherein each of said detecting elements of said first and second groups has a substantially equal spectral sensitivity against white color, and said detecting element outputs said detection signal.

4. The glare sensor of claim 1, wherein said detection means comprises a planar substrate, and said detection elements are arranged on said substrate in a form of matrix with high density.

5. The glare sensor of claim 4, wherein each detection element comprises a photo-diode.

6. The glare sensor of claim 1, wherein said first detecting elements and said second detecting elements are arranged alternately with each other.

7. The glare sensor of claim 1, further comprising a beam splitter disposed between said lens means and said detection means.

8. The glare sensor of claim 7, wherein said first elements group is disposed at a first position of said holder means and said second elements group is disposed at a second position of said holder means, and the light beams splitted by said beam splitter are directed towards both said first position and said second position of said holder means.

9. The glare sensor of claim 7, wherein said beam splitter comprises a half mirror inclined by 45°.

10. The glare sensor of claim 1, further comprising red filters facing each of said second detection elements.

11. The glare sensor of claim 1, further comprising an optical transmitting means disposed between said lens means and said detection means.

12. The glare sensor of claim 11, wherein said lens means comprises a Fresnel lens, and said optical transmitting means comprises optical fibers arranged in a form of matrix, an end of each of said optical fibers positions at an image forming plane of respective one of said Fresnel lens, and the other end of each of said optical fibers faces a pair of said first and second detecting elements.

13. The glare sensor of claim 1, wherein said lens means a plurality of image forming lenses arranged in a lateral line.

14. The glare sensor of claim 13, further comprising an optical transmitting means disposed between said image forming lenses and said detection means and a beam splitter disposed between said optical transmitting means and said detection means.

15. The glare sensor of claim 14, wherein said optical transmitting means comprises a plurality of optical fibers.

16. The glare sensor of claim 15, wherein at least a couple of said optical fibers faces at an end thereof respective said image forming lenses and the other end of said couple of optical fibers faces said beam splitter, whereby transmitting light beams both to said first and second detection elements groups.

17. The glare sensor of claim 14, wherein said optical transmitting means comprises a light-conducing lens formed unitarily of a transparent resin, and ends of said light-conducing lens at a front surface are shifted vertically with respect to an axial line of said light-conducting lens.

18. The glare sensor of claim 1, wherein said holder means comprises a casing body for accommodating both said first and second detecting element groups.

19. The glare sensor of claim 18, wherein said casing body is mounted on a vehicle close to a front bumper thereof.

20. The glare sensor of claim 1, wherein said holder means comprises a first casing body for accommodating said first detection elements group and a second casing body for accommodating said second detection elements group.

21. The glare sensor of claim 20, wherein said first casing body is mounted on the vehicle close to a front bumper thereof and said second casing body is mounted close to a window shield.

22. The glare sensor of claim 1, wherein said lens means comprises a stationary lens series fixed to said holder means and a movable lens series slidably mounted in said holder means, an optical axis of said stationary lens series is coincident with that of said movable lens series, and further comprising means for driving said movable lens series.

23. The glare sensor of claim 22, wherein said stationary lens series comprises at least one convex lens and said movable lens series comprises at least one concave lens.

24. The glare sensor of claim 22, wherein said movable lens driving means slides said movable lens series in accordance with a distance between the subject to be detected and said vehicle.

25. The glare sensor of claim 1, wherein said lens means comprises a plurality of convex lenses a focal length of which is different from each other.

26. The glare sensor of claim 1, wherein said detection signal is an electrical signal having an intensity corresponding to the color.

27. The glare sensor of claim 1, further comprising a diaphragm disposed in said holder means between said lens means and said detection means.

28. The glare sensor of claim 1, wherein said holder means comprises a cylindrical casing.

29. The glare sensor of claim 1, wherein said holder means comprises a T-shaped cylindrical casing.

30. A glare sensor for a vehicle, comprising:
a lens means for condensing incident light; and
means for discriminating between red light and white light so as to distinguish between a car travelling in the same direction as said vehicle and a car travelling in an opposition direction, said discriminating means generating a detection signal in response to said discrimination.

31. A glare sensor for a vehicle, comprising:
a lens means for condensing incident light; and
means for detecting color and relative direction of an incident light condensed by said lens means, said detection means generating a detection signal in response to said detection.

32. A glare sensor for a vehicle which automatically changes intensity or direction of light beams emitted from vehicular headlamp in accordance with a color or an intensity of front side brightness of the vehicle, comprising:
a lens means for condensing incident light;
means for detecting at least one of color and intensity of said incident light condensed by said lens means, said detection means generating a detection signal in response said detection; and
means for operatively changing a light distribution pattern of the headlamp of the vehicle in accordance with a detected intensity of said incident light beam emitted from an oppositely running vehicle.

33. The glare sensor of claim 32, wherein said light distribution pattern changing means comprises means for moving a shade disposed in front of a light source of the headlamp up and down.

34. The glare sensor of claim 33, wherein said headlamp comprises a substantially oval-shaped reflector, and said light distribution pattern changing means comprises means for moving a shade disposed at a second focal point of said oval reflector up and down.

35. The glare sensor of claim 34, wherein said shade is divided into two sections each of which independently rotating horizontally.

* * * * *